(12) United States Patent
Emde et al.

(10) Patent No.: US 10,097,121 B2
(45) Date of Patent: Oct. 9, 2018

(54) METHOD AND DEVICE FOR CONTROLLING AN ELECTRIC MOTOR

(71) Applicant: Robert Bosch GmbH, Stuttgart (DE)

(72) Inventors: Christoph Emde, Leingarten (DE); Andreas Schmidtlein, Tamm (DE); Rainer Baumgaertner, Pfaffenhofen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 42 days.

(21) Appl. No.: 15/287,550

(22) Filed: Oct. 6, 2016

(65) Prior Publication Data
US 2017/0070170 A1 Mar. 9, 2017

Related U.S. Application Data

(63) Continuation of application No. 12/678,343, filed as application No. PCT/EP2008/062356 on Sep. 17, 2008.

(30) Foreign Application Priority Data

Sep. 24, 2007 (DE) .......................... 10 2007 045 573
Aug. 1, 2008 (DE) .......................... 10 2008 040 920

(51) Int. Cl.
*H02P 6/34* (2016.01)
*H02P 29/50* (2016.01)
*H02P 27/08* (2006.01)
*H02M 1/44* (2007.01)

(52) U.S. Cl.
CPC ................ *H02P 6/34* (2016.02); *H02P 27/08* (2013.01); *H02P 29/50* (2016.02); *H02M 1/44* (2013.01)

(58) Field of Classification Search
CPC ............ H02P 6/34; H02P 29/50; H02P 27/08; H02M 1/44
USPC ................................. 318/599, 560, 503, 494
See application file for complete search history.

(56) References Cited

U.S. PATENT DOCUMENTS

| | | |
|---|---|---|
| 5,203,178 A | 4/1993 | Shyu |
| 5,442,535 A | 8/1995 | Bourgeios |
| 6,088,246 A | 7/2000 | Okuyama et al. |
| 6,775,164 B2 | 8/2004 | Wong et al. |
| 7,120,037 B2 | 10/2006 | Komatsu et al. |

(Continued)

FOREIGN PATENT DOCUMENTS

| | | |
|---|---|---|
| DE | 3539558 | 5/1987 |
| DE | 10332933 A1 | 2/2005 |
| DE | 102007 003737 | 8/2007 |

(Continued)

OTHER PUBLICATIONS

Machine translation DE10200700737.*
Machine translation DE3539558.*

*Primary Examiner* — Kawing Chan
(74) *Attorney, Agent, or Firm* — Norton Rose Fulbright US LLP; Gerard Messina

(57) ABSTRACT

A method and a device for controlling an electric motor using pulse-width modulated control signals. Control pulses having a setpoint duty factor and temporally varying pulse widths and pulse spacing are generated in the process, the temporally varying pulse widths and pulse spacing being selected as a function of a load and/or thermal loading of the electric motor and/or its control device.

33 Claims, 9 Drawing Sheets

(56) References Cited

U.S. PATENT DOCUMENTS

2004/0263100 A1  12/2004  Heravi et al.

FOREIGN PATENT DOCUMENTS

| EP | 0886369 | 12/1998 |
| EP | 1067669 | 1/2001 |
| EP | 1286459 | 2/2003 |
| EP | 1505303 | 2/2005 |
| JP | 200125258 | 1/2001 |
| JP | 2006191756 | 7/2006 |

* cited by examiner

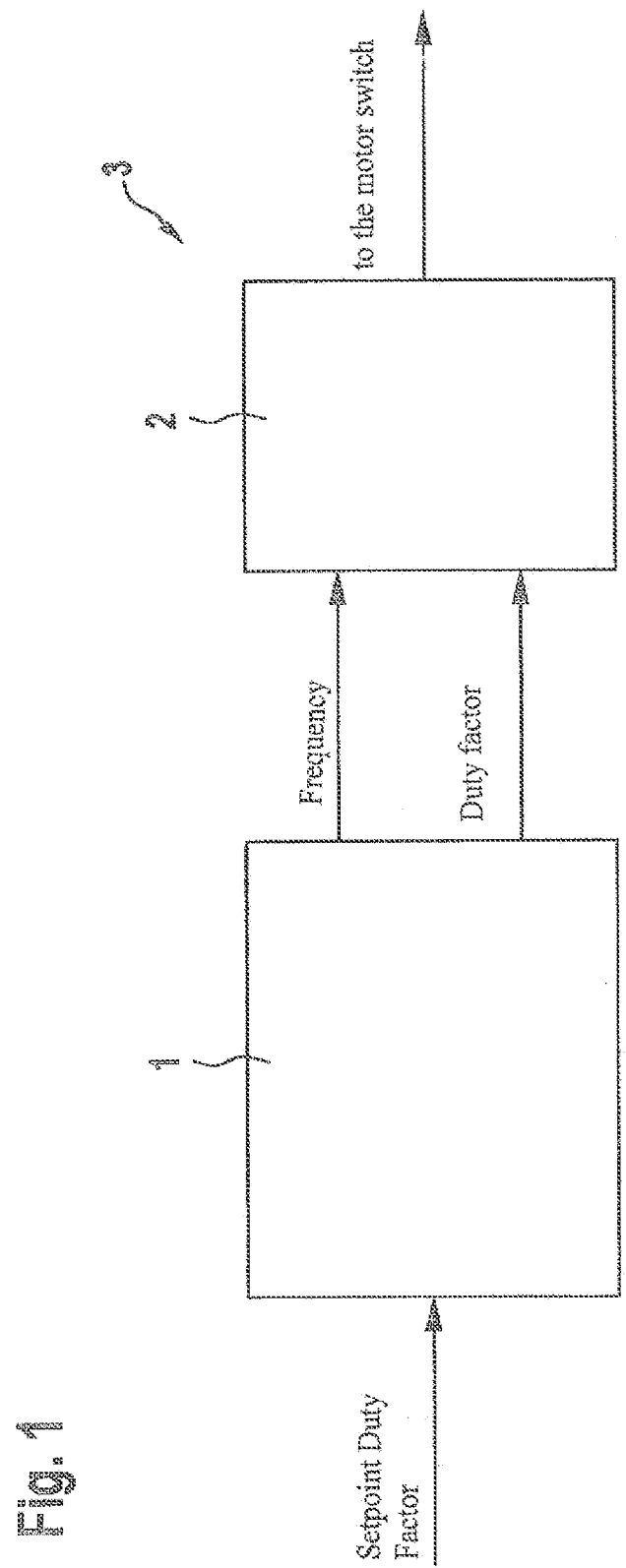

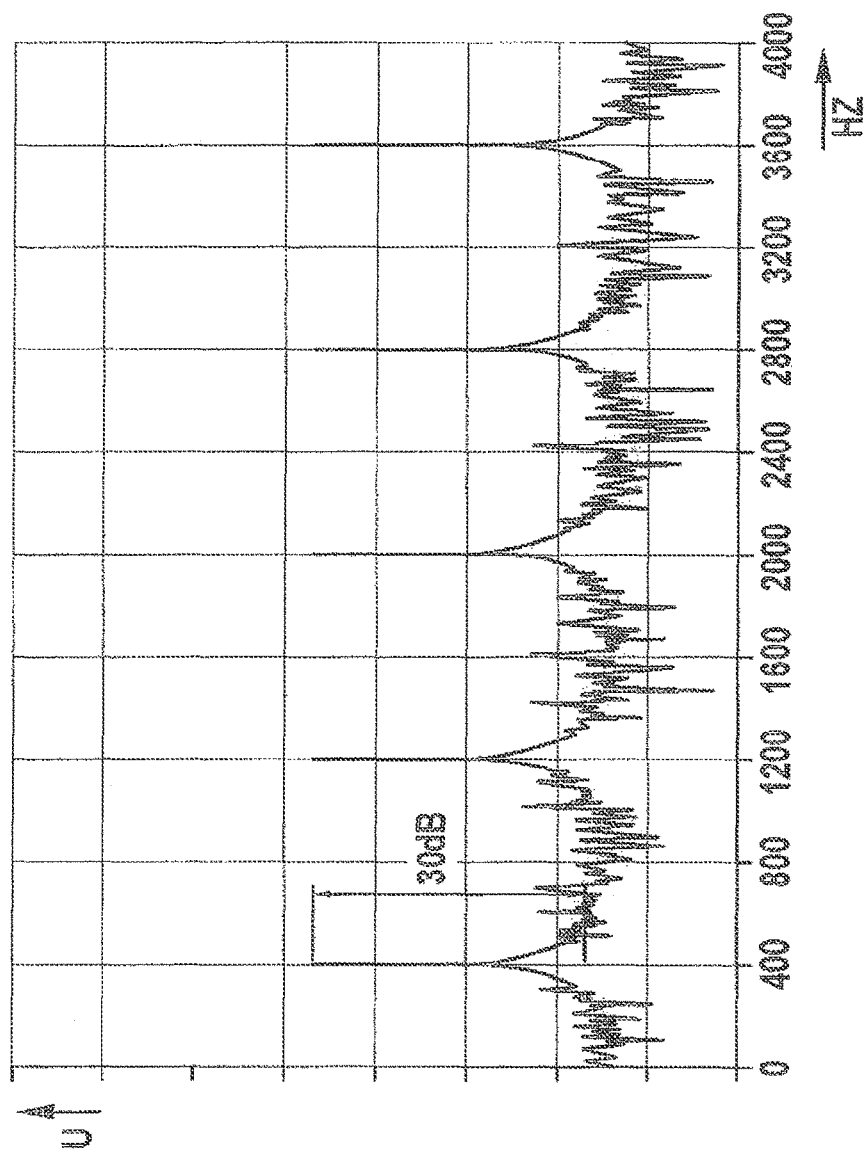

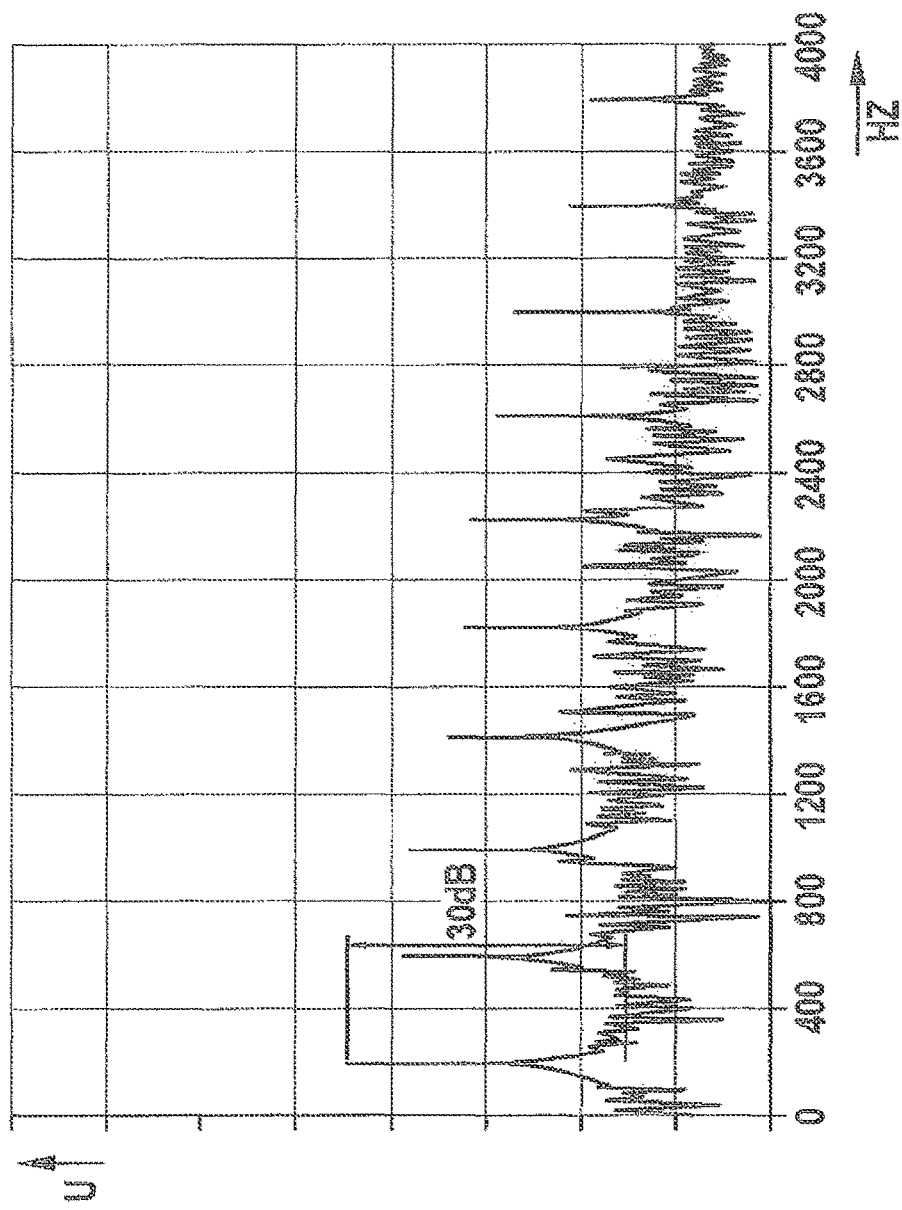

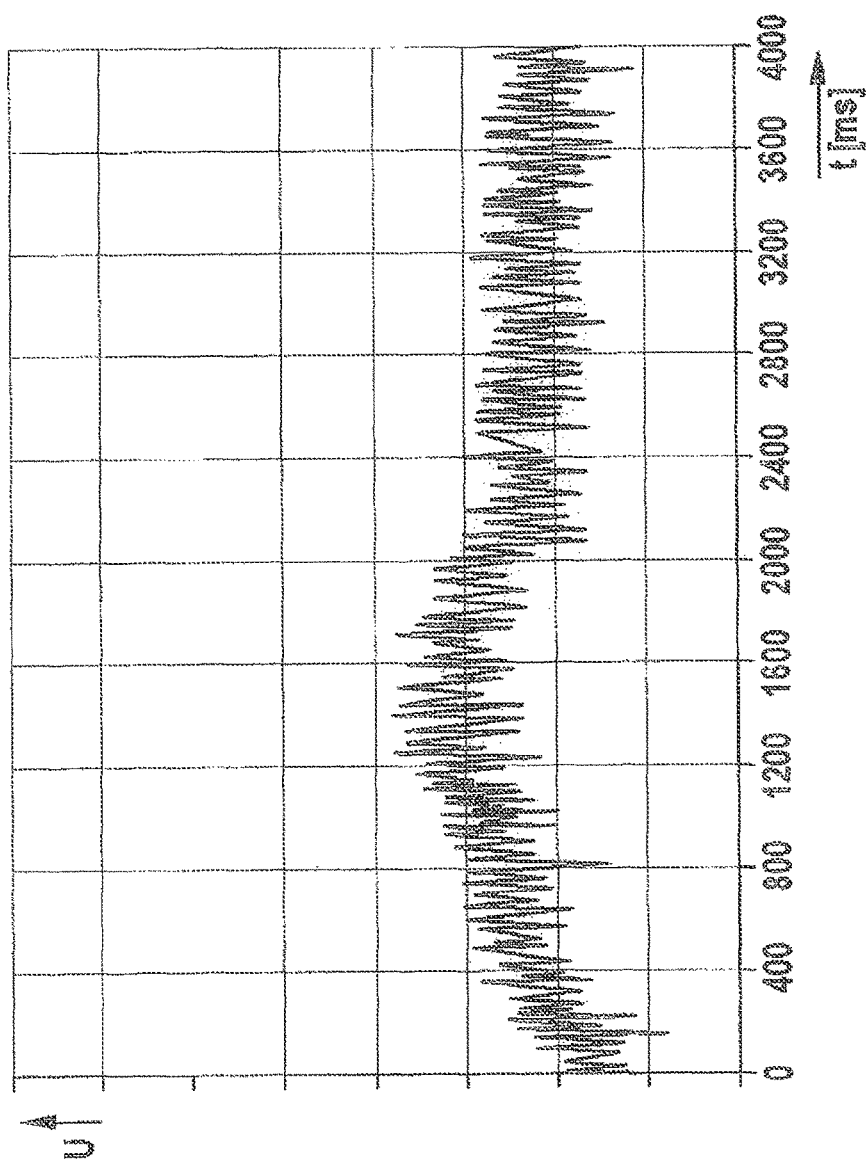

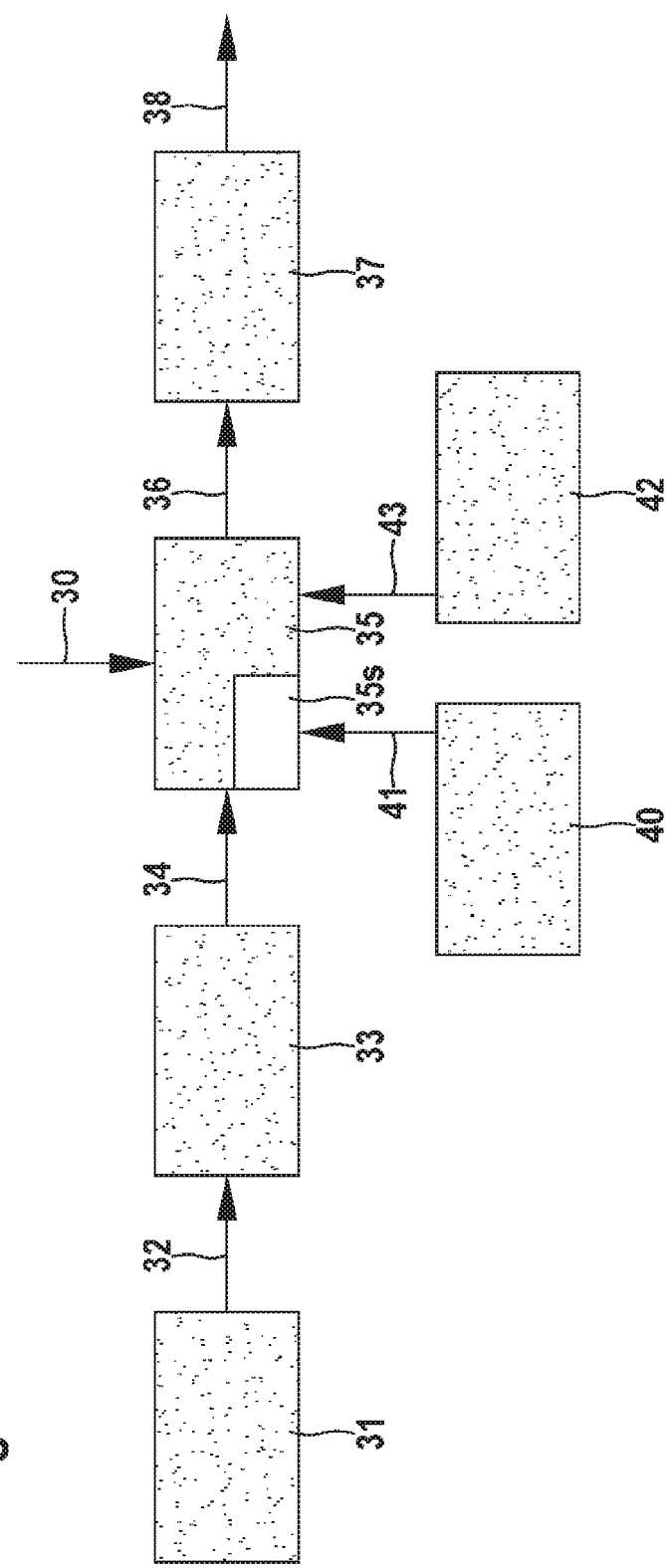

METHOD AND DEVICE FOR CONTROLLING AN ELECTRIC MOTOR

CROSS-REFERENCE TO RELATED APPLICATIONS

The present application is a continuation application of U.S. patent application Ser. No. 12/678,343, filed on Mar. 16, 2010, which is a national phase of International Patent Application No. PCT/EP2008/062356, filed Sep. 17, 2008, and claims priority to German Patent Application Nos. DE 10 2007 045 573.0, filed on Sep. 24, 2007, and DE 10 2008 040 920.0, filed on Aug. 1, 2008, all of which are hereby incorporated by reference in their entireties in the accompanying patent application.

FIELD OF THE INVENTION

The present invention relates to a method and a device for controlling an electric motor using pulse-width modulation.

BACKGROUND INFORMATION

Such a pulse-width modulation control may be a low-frequency control, which constitutes a relatively inexpensive approach up to 100 Hz. Additional costs arise if the pulse-width modulation frequency is shifted into an inaudible high-frequency ultrasonic range above 20 kHz, the more so since the EMC specifications (electromagnetic compatibility) to be observed in this case are difficult to satisfy, so that this method is currently not used much.

The conventional cost-effective control methods generate electromechanical sound emissions as a result of the related low-frequency sampling of the pulse-width modulation. The generated sound emissions have high energy and a narrow bandwidth. Because of the narrow band width and the high energy, these sound emissions are clearly audible to the human ear. In particular when the ambient noise is lower, the interfering narrow-band noise of the electric motor drowns out the ambient noise due to the pulse-width modulated control, so that it is virtually impossible to ignore this interfering noise.

Japanese patent document JP 2006191756 A discusses a control method of a DC motor, in which a spectral diffusion modulation of the PWM frequency is implemented for the purpose of noise suppression.

SUMMARY OF THE INVENTION

The exemplary embodiments and/or exemplary methods of the present invention provides a method for controlling an electric motor using pulse-width modulated control signals as described herein, and a corresponding device as described herein.

According to the exemplary embodiments and/or exemplary methods of the present invention, the modulation of the pulse spacing is made dependent on a power requirement of the engine and/or the thermal loading of its component or its control. In most cases the physical situation in the control of electric motors is such that from the standpoint of noise and controllability, a control using higher control frequencies is desired, which normally leads to higher power losses. In order to be able to proceed in a cost-optimal manner in the thermal configuration of the motor path, a compromise is therefore reached, to the effect that a noise-optimal control is implemented only in specific situations or over limited periods of time. In situations with low thermal loading, in particular, better noise performance is achievable than in situations in which the thermal load is high.

According to an exemplary method and/or embodiment, a minimum and a maximum period duration are specified as a function of the load and/or the thermal loading of the electric motor and/or its control device.

The minimum and maximum period durations may be specified such that they increase with rising load and/or thermal loading of the electric motor and/or its control device.

Advantageous further refinements constitute the subject matter further described herein.

The electric motor may be a DC or AC motor having a commutator motor, or an AC motor without commutator motor. Furthermore, the electric motor may be a rotary motor or a linear motor.

Varying the time spacing of the control pulses, i.e., by varying the pulse-width modulation frequency, the sound emission spectrum of the electric motor is able to be shifted, especially in the direction of a sound emission spectrum of the ambient noise.

A variation of the pulse-width modulation frequency according to the present invention makes it possible to adapt the sound emission spectrum of the electric motor to a sound emission spectrum of ambient noise in an advantageous manner, such that the noise emissions of the electric motor are virtually indistinguishable from the ambient noise, so that the electric motor controlled by varying the pulse-width modulation frequency also does not generate any narrow-band, highly energetic noise, thereby reducing the acoustic loading.

The narrow-band noise emission of the controlled electric motor as it occurs in the audible range when using a fixed pulse-width modulation frequency may be replaced by an adaptation to the sound frequency generated by the environment, so that the sound emission spectrum of the electric motor in its entirety is virtually masked by the ambient noise. The exemplary embodiments and/or exemplary methods of the present invention therefore implements the motor control in such a way that the noise emissions produced by the sampling in the pulse-width modulation are able to be hidden in an ambient noise more effectively.

Moreover, with the aid of a previously performed sound-frequency analysis of the ambient noise, an engine control is realizable whose noise emissions are directly tailored to the noise spectrum of the environment, thereby not only being masked by an ambient noise but also no longer being distinguishable from this ambient noise by the human ear. As a result, the exemplary embodiments and/or exemplary methods of the present invention deviates considerably from the conventional engine-control concepts, which are at least intermittently based on a fixed pulse-width modulation frequency, the modulation of the control being implemented by adjusting the pulse-width modulation duty factor (PWM duty).

Therefore, the exemplary embodiments and/or exemplary methods of the present invention, for one, is based on the modulation of the control via the setting of the pulse-width modulation duty factor; for another, the pulse-width modulation frequency is modulated in such a way that the electromagnetically generated noise emissions produced by the sampling, and which may be the EMC emissions, have a desired spectral ratio and sound emission spectrum.

This makes it possible to achieve a predictable and adaptable emission behavior. The vehicle environments differ markedly, especially in the motor vehicle field, e.g., in diesel vehicles, gasoline vehicles or electric vehicles, so that the adaptability of the method according to the present invention permits an advantageous functionality. Moreover, with increasing power requirements and increasing thermal loading, for example, both power losses and the temperature of the electric motor are able to be reduced by increasing the minimally used pulse durations.

Furthermore, with a decreasing power requirement and decreasing thermal loading of the electric motor, the loading of the vehicle electrical system and the controllability of the electric motor are able to be optimized by reducing the minimally used pulse durations.

The exemplary embodiments and/or exemplary methods of the present invention will now be described in greater detail in the following text with reference to the attached figures.

BRIEF DESCRIPTION OF THE DRAWINGS

FIG. 1 shows a schematic block circuit diagram of an exemplary engine control.

FIGS. 3A and 3B show comparative schematic diagrams of frequency analyses of the control signals.

FIGS. 4A and 4B show additional comparative schematic diagrams of frequency analyses of the control signals.

FIG. 5 shows a schematic block diagram of a motor control according to one specific embodiment of the present invention.

DETAILED DESCRIPTION

Figure 2A:
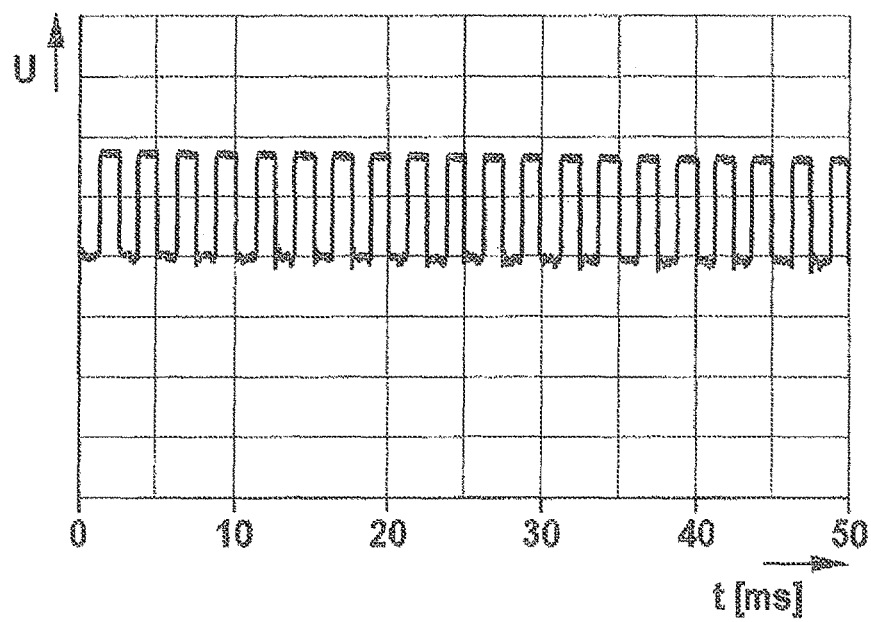
FIGS. 2A and 2B show comparative schematic diagrams of motor-control signals.

FIG. 1 shows a schematic block diagram of an exemplary motor control 3 of an electric motor.

First, a setpoint control emission spectrum, which is obtained from a sound analysis of the ambient noise, for example, is provided in a circuit block 1. As an alternative or in addition, different noise emission spectrums of internal combustion engines, for instance, or of driving and rolling noises of vehicles may be available in stored table form as setpoint control-emission spectrum. A memory in which different sound emission spectrums are stored may be provided. For example, a corresponding sound emission spectrum may be stored for different motor types, e.g., Diesel, electric or gasoline motors, which is taken into account when selecting the pulse-width modulation frequencies. In addition, the operating state of a vehicle, especially the motor's rotational speed, the velocity or the road condition may be taken into account when selecting the pulse-width modulation frequency.

A setpoint duty factor, also referred to as duty, is forwarded to circuit block 1 for modulating the motor output. Depending on the setpoint duty factor and the desired setpoint control emission spectrum as it is stored as table and/or as it is specified via tables in cooperation with a random-check generator, a variation of the pulse-width modulation frequency is supplied to a circuit block 2 together with corresponding values of the duty factor.

In circuit block 2, a variation of the pulse widths and pulse spacing is generated, and a pulse-width modulation frequency sequence is subsequently forwarded to a motor switch for the control of the electric motor.

The basis of the variation of the pulse widths and pulse spacing is the creation of a desired spectral behavior $Spec_{total}$ from the totality of the spectrums of the set pulse-width modulation frequencies $Spec(f_{pwm}(i))$ $$Spec_{total} = (\Sigma \alpha_i \cdot Spec(f_{pwm}(i))) \text{ with } \alpha_i \text{ as weighting.} \quad (1)$$

If the emitted spectrum coalesces into a single pulse-width modulation frequency, then $Spec(f_{pwm}(i))$ may be determined through a measurement, for instance. In addition, the individual transmission functions are able to be modeled, and the pulse-width modulation frequency $Spec(f_{pwm}(i))$ is able to be calculated in a model-based manner. Weighting $\alpha_i$ may be determined as an inverse calculation from the desired spectrum with the aid of the following formula (2).

$$Spec_{total} = (\Sigma \alpha_i \cdot Spec(f_{pwm}(i))) = Spec_{Ssetpoint} = \Sigma \beta_j \cdot Spec(f(j)). \quad (2)$$

A detailed construction of weighting $\alpha_i$ using equation (2), and the subsequent uniform distribution of the pulse-width modulation control frequency within a time range may lead to systems having tailor-made sound emission spectrums, which are then realized by tables and/or tables and random check generators.

In the simplest case a uniformly distributed weighting $\alpha_i$ may be selected. The resulting sound emission spectrum will generally not be white, the more so since the pulse-width modulation frequencies $Spec(f_{pwm}(i))$ in actual, complete systems are folded. A formulation with uniformly distributed weighting $\alpha_i$ may suffice in certain cases. For the pulse-width modulation of the motor control as a function of a setpoint duty factor and the desired setpoint control emission spectrum, frequency values and duty factor values are produced by varying the pulse-width modulation frequency in circuit block 2, and forwarded to a motor switch.

A motor control using a variable pulse-width modulation frequency enables an active noise adaptation, so that fewer narrow-band components are contained in the sound emission spectrum. The noise of the electric motor is subjectively conceived as less annoying because it is difficult to distinguish from the normal driving noises.

Figure 2B:
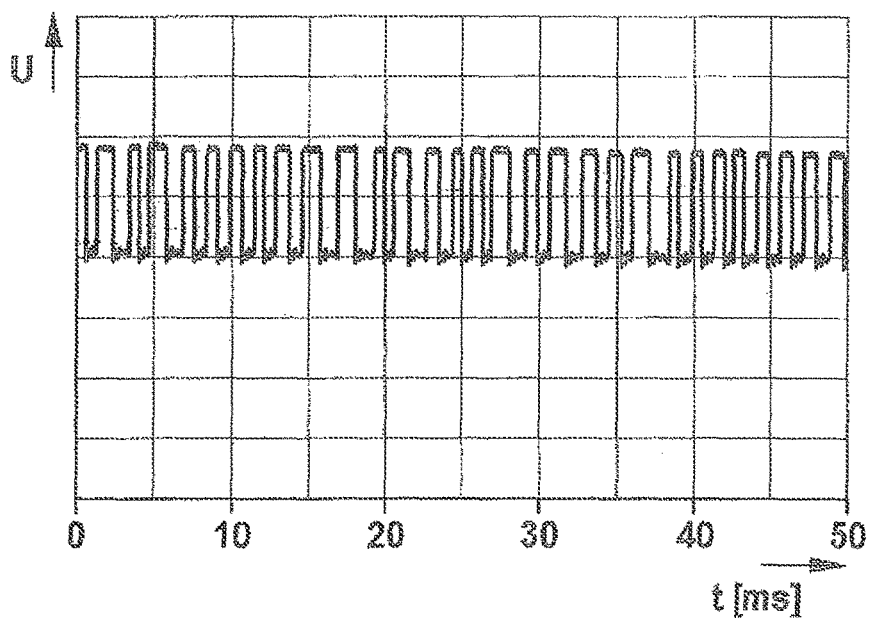

FIGS. 2A and 2B show comparative schematic diagrams of electric motor controls. FIG. 2A shows a motor control using a fixed pulse-width modulation frequency of 400 Hz. Time t, in milliseconds, has been indicated on the abscissa of this oscillogram, and voltage U on the ordinate. The fixed pulse-width modulation frequency of 400 Hz can be gathered from the completely uniform pulses that follow each other temporally. In this instance, for example, a duty factor of 50% is observed. This duty factor of 50% is also shown in FIG. 2B, but the pulse-modulation frequency is variable in this case, which can be gathered from the different time intervals of individual pulse sequences. While a motor controlled by control signals according to FIG. 2A produces obvious narrow-band noise emissions, a motor controlled by signals according to FIG. 2B generates noise that is covered by the ambient noise. This is illustrated even more clearly by the following figures.

Figure 3B:
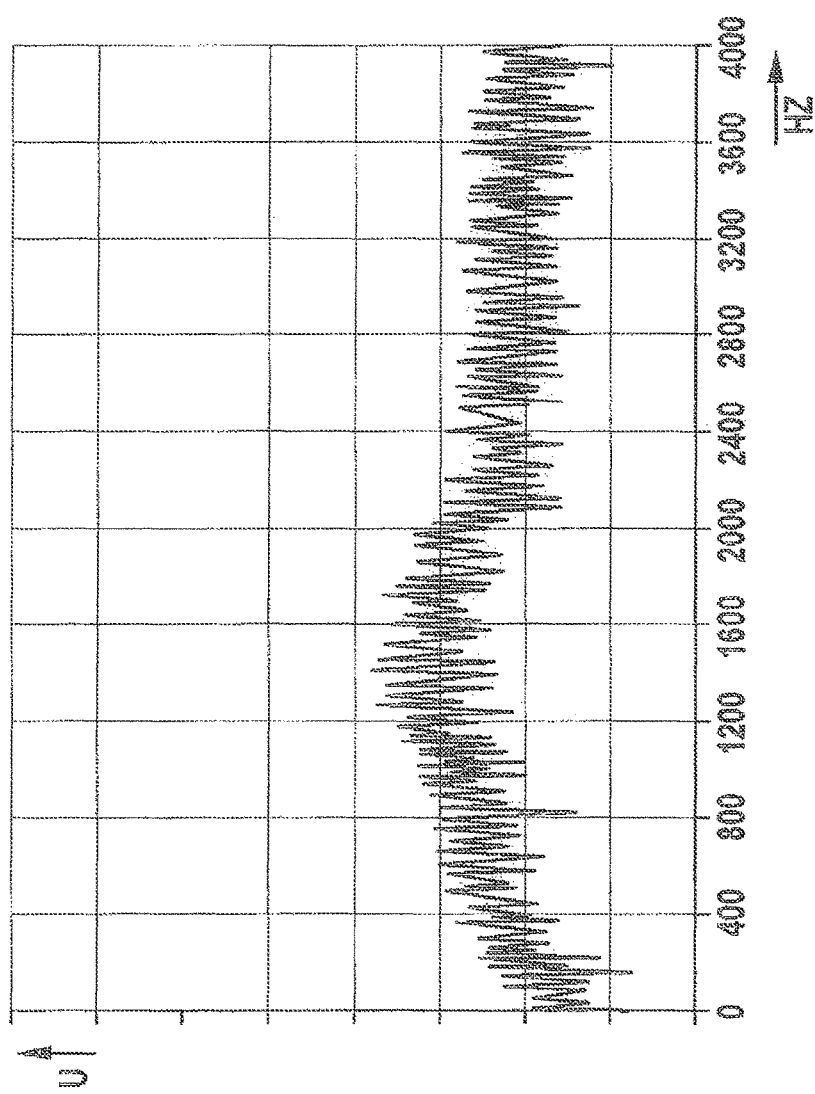

FIGS. 3A and 3B show comparative schematic diagrams of frequency analyses of the control signals. FIG. 3A shows a control using a fixed pulse-width modulation frequency of 200 Hz. Once again, the abscissa shows the frequency in Hz, while the ordinate indicates the electrical voltage as control signal. Whereas in FIG. 3A obvious peaks with amplitudes of 30 dB—and thus quite audible—are noticeable at 200 Hz for the trigger signal, the variation of the pulse-width modulation frequency as shown in FIG. 3B attains a spectrum that corresponds approximately to the normal noise emission spectrum of a vehicle in motion, the maximum amplitude difference amounting to a mere 18 dB.

FIGS. 4A and 4B show additional comparative schematic diagrams of frequency analyses of the control signals. FIG. 4A shows the control at a fixed pulse-modulation frequency of 400 Hz as well as the attendant electrical voltages and frequencies of the control signal; once again, an amplitude of approximately 30 dB is clearly visible at the characteristic points for 400 Hz, which stands out against the background and thus the ambient sound emissions. In contrast, FIG. 4B illustrates, as already shown in FIG. 3B, a voltage spectrum of the control signal that has no narrow-band characteristic peaks because the disclosure of the exemplary embodiments and/or exemplary methods of the present invention is utilized in an advantageous manner in this instance in that the pulse-width modulation frequency is varied. Frequencies in a range between 1 kHz and 6 kHz, for example, may be used for the pulse-width modulation.

Using the described variation of the frequency of the pulse-width modulation prevents the electric motor from generating acoustic signals having a frequency width of less than 300 Hz. The acoustic signals of the electric motor having a frequency width that is less than 200 Hz may be avoided in the control of the electric motor by varying the pulse-width modulation frequency.

In a further variant, the variation of the pulse-width modulation frequency prevents the generation of acoustic signals having a frequency width of less than 10 Hz during operation of the electric motor.

FIG. 5 shows a schematic block diagram of a motor control according to a fourth specific embodiment of the present invention.

In this fourth specific embodiment, the control pulses are modulated using a setpoint pulse factor 30 as well as temporally varying pulse widths and pulse spacings as a function of a measured ambient noise level.

To this end, ambient noise level 32 is detected with the aid of a corresponding ambient-noise level measuring device 31, e.g., a microphone, and forwarded to a determination device 33 for determining the ambient noise spectrum.

Determined ambient noise spectrum 34 and setpoint duty factor 30 are forwarded to a corresponding selection device 35 for selection of an appropriate control spectrum from a data memory 35s. Read-out control spectrum 36 is forwarded to a specification device 37 for specification of a corresponding control frequency. Specification device 37 transmits control frequency 38 to the motor relay.

As an alternative, selection device 35 may also calculate control spectrum 36.

In addition, control spectrum 35 is selected in the described manner as a function of a load parameter 41 (e.g., current multiplied by the supply voltage) of the electric motor and/or a temperature in the motor path. To this end, a device is provided for measuring or calculating load situation 40 in the motor. A temperature-measuring device 42 for recording the temperature and for outputting a corresponding signal 43 is provided in order to determine the thermal situation in the motor path.

In general, the pulse widths and pulse spacing at high thermal loading or at high mechanical loading are modified in such a way that lower power losses are produced, the control frequency being lowered, in particular.

In situations in which the thermal loads or the mechanical loads are low, this does indeed make it possible to obtain better noise adaptations than in situations in which the thermal loads or the mechanical loads are high.

In this development, more specifically, a minimum and a maximum period duration of the PWM control are specified on the basis of the detected load and/or temperature, and the control spectrum is selected or calculated accordingly.

Figure 6A:
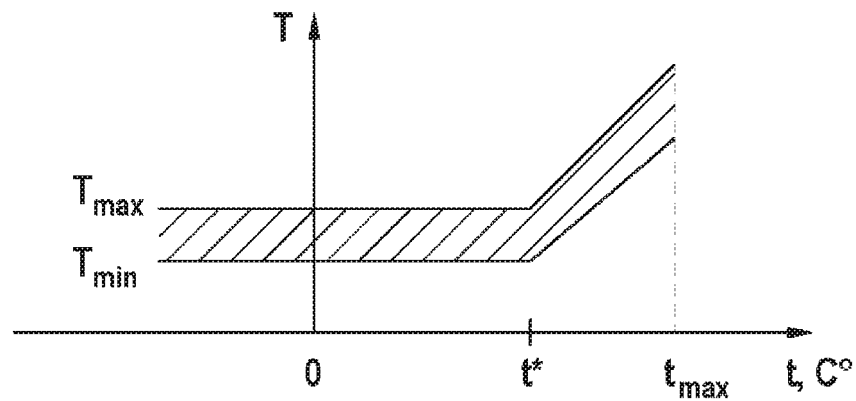
FIGS. 6A and 6B show a minimum and maximum period duration as a function of the temperature of the semiconductor switch.

FIG. 6A shows a minimum and maximum period duration as a function of the temperature of a semiconductor switch.

For this purpose, period duration T of the motor control has been plotted on the y-axis, and temperature t of the semiconductor switch has been plotted on the x-axis. With rising temperatures, there is an increase in both minimum period duration $T_{min}$ and maximum period duration $T_{max}$, starting with a temperature t*, until maximally permissible temperature $t_{max}$ of the semiconductor switch has been reached, in order to optimize the power loss and thus the temperature of the semiconductor switch.

Conversely, to optimize noise, EMC radiation, loading of the vehicle electrical system and controllability, the lower temperature t, the smaller both minimum period duration $T_{min}$ and also maximum period duration $T_{max}$.

Figure 6B:
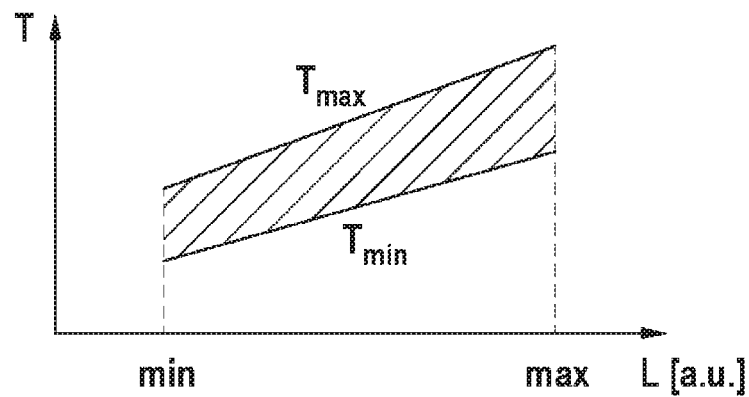

A permitted band of period durations lies between minimum period duration $T_{min}$ and maximum period duration $T_{max}$. FIG. 6B shows a minimum and maximum period duration as a function of the engine load.

For this purpose, period duration T of the motor control is plotted on the y-axis, and load L of the motor on the x-axis. To optimize the power loss and thus the temperature, both minimum period duration $T_{min}$ and maximum period duration $T_{max}$ increase with increased loading.

Conversely, the lower load L in the motor path, the smaller also both minimum period duration $T_{min}$ and maximum period duration $T_{max}$. This makes it possible to optimize the noise, EMC radiation, loading of the vehicle electrical system and the controllability.

A permitted band of period durations lies between minimum period duration $T_{min}$ and maximum period duration $T_{max}$.

Figure 7:
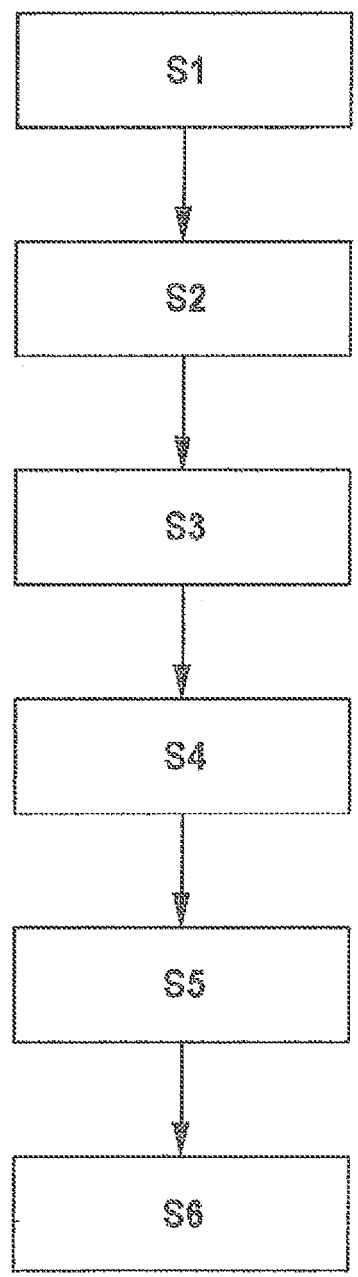
FIG. 7 shows a flow chart to elucidate a motor control method according to a further specific embodiment of the present invention.

FIG. 7 shows a flow chart to elucidate a motor control method according to a further specific embodiment of the present invention.

In step S1, ambient noise level 32 is detected via ambient noise-level measuring device 31, e.g., a microphone, and transmitted to determination device 33 in order to determine the ambient noise spectrum.

In step S2, load 41 in the motor and thermal condition 43 in the motor path are detected.

Determined ambient noise spectrum 34, setpoint duty factor 30, and load 41 in the motor, as well as thermal condition 43 in the motor path are transmitted to selection device 35 in step S3 for the selection of a corresponding control spectrum from a data memory 35s.

From load 41 in the motor and from thermal condition 43 in the motor path, selection device 35 first determines a permissible band of period durations between a minimum period duration $T_{min}$ and a maximum period duration $T_{max}$, and subsequently selects a corresponding control spectrum in step S4.

In step S5, read-out control spectrum 36 is forwarded to a specification device 37 for the purpose of specifying a corresponding control frequency. Specification device 37 transmits control frequency 38 to the motor relay in step S6.

Exemplary uses of the aforementioned specific embodiments in the motor vehicle include, for example, window lifters, vacuum pumps, windshield wipers, gasoline pumps, fan motors, level controls, electric heaters, hybrid controls etc.

What is claimed is:

1. A method for controlling an electric motor using pulse-width modulation, the method comprising:
   generating control pulses having a setpoint duty factor and temporally varying pulse widths and pulse spacing;
   varying the pulse widths and the pulse spacing so that a sound emission spectrum generated by the control of the electric motor using the control pulses is approximated to a spectrum of ambient noise; and
   controlling the electric motor using the control pulses, wherein the temporally varying pulse widths and pulse spacing are generated as a function of at least one of a load of the electric motor and a thermal loading of a control device of the electric motor;
   wherein a minimum period duration and a maximum period duration are specified as a function of at least one of the load of the electric motor and of the thermal loading of the control device,
   wherein an operating state is taken into account when selecting the pulse-width modulation frequency, and
   wherein the pulse widths and pulse spacing are varied based on a spectral behavior $Spec_{total}$ determined from a totality of spectrums of the set pulse-width modulation frequencies $Spec(f_{pwm}(i))$.

2. The method of claim 1, wherein the minimum period duration is specified so that it increases with at least one of a rising load of the electric motor and a thermal loading of the control device, and wherein the maximum period duration is specified so that it increases with at least one of a rising load of the electric motor and a thermal loading of the control device.

3. The method of claim 2, further comprising:
   implementing a sound-frequency analysis of ambient noise to obtain a sound-emission spectrum of the environment;
   wherein the variation of the pulse widths and the pulse spacing occurs as a function of the sound emission spectrum of the environment.

4. The method of claim 1, wherein the minimum period duration is specified so that it increases with at least one of a rising load of the electric motor and a thermal loading of the control device.

5. The method of claim 1, wherein the maximum period duration is specified so that it increases with at least one of a rising load of the electric motor and a thermal loading of the control device.

6. The method of claim 1, further comprising:
   implementing a sound-frequency analysis of ambient noise to obtain a sound-emission spectrum of the environment;
   wherein the variation of the pulse widths and the pulse spacing occurs as a function of the sound emission spectrum of the environment.

7. The method of claim 1, wherein the duty factor remains constant regardless of the modulation of the pulse widths.

8. The method of claim 1, wherein the electric motor controlled by varying the pulse-width modulation frequency does not generate any narrow-band, highly energetic noise, so as to reduce an acoustic loading.

9. The method of claim 1, wherein with increasing power requirements and increasing thermal loading of the electric motor, power losses and a temperature of the electric motor are reduce-able by increasing minimally used pulse durations.

10. The method of claim 9, wherein with a decreasing power requirement and decreasing thermal loading of the electric motor, the loading of the electrical system and the controllability of the electric motor are optimizable by reducing the minimally used pulse durations.

11. The method of claim 1, wherein with a decreasing power requirement and decreasing thermal loading of the electric motor, the loading of the electrical system and the controllability of the electric motor are optimizable by reducing the minimally used pulse durations.

12. The method of claim 1, wherein the operating state includes at least one of a rotational speed of the electric motor, a velocity or a road condition.

13. The method of claim 1, wherein $Spec_{total}=(\Sigma\alpha_i \cdot Spec(f_{pwm}(i))$ with $\alpha_i$ as a weighting.

14. The method of claim 13, wherein a uniformly distributed weighting $\alpha_i$ is selected.

15. The method of claim 13, wherein the weighting al is determined as an inverse calculation from a desired spectrum with the following formula: $Spec_{total}=(\Sigma\alpha_i \cdot Spec(f_{pwm}(i)))=Specs_{setpoint}=\Sigma\beta_j \cdot Spec(f(j))$.

16. A device for controlling an electric motor using pulse-width modulation, comprising:
   a generating device to generate control pulses having a setpoint duty factor and temporally varying pulse widths and pulse spacing; and
   a control device to control the electric motor using the control pulses;
   wherein the temporally varying pulse widths and pulse spacing are varied so that a noise emission spectrum generated by the control of the electric motor using the control pulses is approximated to a spectrum of ambient noise,
   wherein the temporally varying pulse widths and pulse spacing are generated as a function of at least one of a load of the electric motor and a thermal loading of the control device of the electric motor,
   wherein a minimum period duration and a maximum period duration are specifiable by the generating device as a function of the at least one of the load of the electric motor and the thermal loading of the control device,
   wherein an operating state is taken into account when selecting the pulse-width modulation frequency, and
   wherein the pulse widths and pulse spacing are varied based on a spectral behavior $Spec_{total}$ determined from a totality of spectrums of the set pulse-width modulation frequencies $Spec(f_{pwm}(i))$.

17. The device of claim 16, wherein the minimum period duration is specified so that it increases with at least one of a rising load of the electric motor and a thermal loading of the control device, and wherein the maximum period duration is specified so that it increases with at least one of a rising load of the electric motor and a thermal loading of the control device.

18. The device of claim 17, further comprising:
   a sound-frequency analysis device to implement a sound-frequency analysis of ambient noise to obtain a sound emission spectrum of the environment, the pulse widths and the pulse spacing being variable as a function of the noise-emission spectrum of the environment.

19. The device of claim 16, wherein the minimum period duration is specified so that it increases with at least one of a rising load of the electric motor and a thermal loading of the control device.

20. The device of claim 16, wherein the maximum period duration is specified so that it increases with at least one of a rising load of the electric motor and a thermal loading of the control device.

21. The device of claim 16, further comprising:
a sound-frequency analysis device to implement a sound-frequency analysis of ambient noise to obtain a sound emission spectrum of the environment, the pulse widths and the pulse spacing being variable as a function of the noise-emission spectrum of the environment.

22. The device of claim 16, further comprising:
a detection device to detect the thermal loading of the control device.

23. The device of claim 22, wherein the detection device is a thermometer.

24. The device of claim 16, wherein the setpoint duty factor is adjustable.

25. The device of claim 16, wherein the setpoint duty factor is adjustable.

26. The device of claim 16, wherein the electric motor controlled by varying the pulse-width modulation frequency does not generate any narrow-band, highly energetic noise, so as to reduce an acoustic loading.

27. The device of claim 16, wherein with increasing power requirements and increasing thermal loading of the electric motor, power losses and a temperature of the electric motor are reduce-able by increasing minimally used pulse durations.

28. The device of claim 27, wherein with a decreasing power requirement and decreasing thermal loading of the electric motor, the loading of the electrical system and the controllability of the electric motor are optimizable by reducing the minimally used pulse durations.

29. The device of claim 16, wherein with a decreasing power requirement and decreasing thermal loading of the electric motor, the loading of the electrical system and the controllability of the electric motor are optimizable by reducing the minimally used pulse durations.

30. The device of claim 16, wherein the operating state includes at least one of a rotational speed of the electric motor, a velocity or a road condition.

31. The device of claim 16, wherein $\text{Spec}_{total}=(\Sigma\alpha_i \cdot \text{Spec}(f_{pwm}(i))$ with $\alpha_i$ as a weighting.

32. The device of claim 31, wherein a uniformly distributed weighting al is selected.

33. The device of claim 31, wherein the weighting al is determined as an inverse calculation from a desired spectrum with the following formula: $\text{Spec}_{total}=(\Sigma\alpha_i \cdot \text{Spec}(f_{pwm}(i)))=\text{Specs}_{setpoint}=\Sigma\beta_j \cdot \text{Spec}(f(j))$.

* * * * *